Dec. 17, 1968     CHENG-LIN CHEN     3,416,372
CORROSIVE LIQUID-METAL-LEVEL GAUGE
Filed Nov. 8, 1966
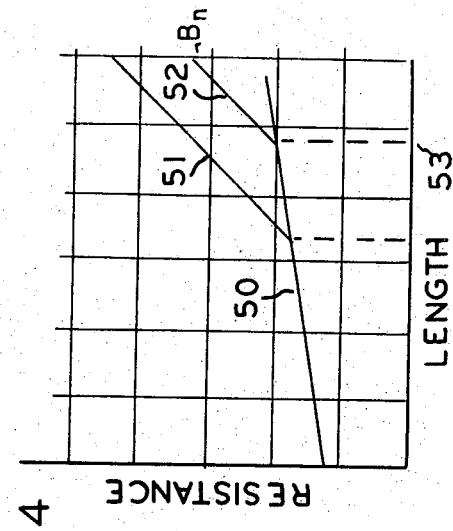
FIG. 5
FIG. 4
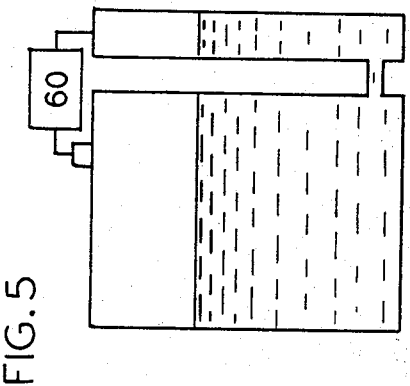
FIG. 2
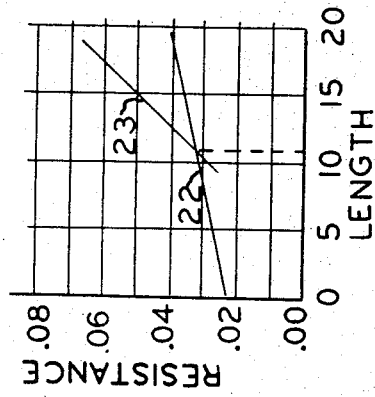
FIG. 1
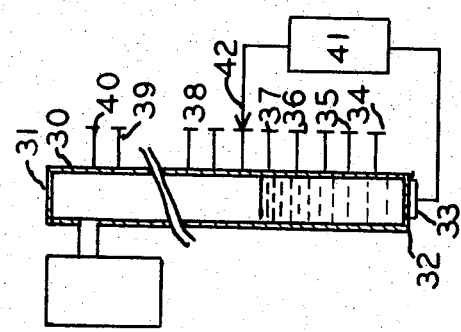
FIG. 3
INVENTOR
CHENG-LIN CHEN
BY
*Richard J. Miller*
ATTORNEY United States Patent Office 3,416,372
Patented Dec. 17, 1968

3,416,372
CORROSIVE LIQUID-METAL-LEVEL GAUGE
Cheng-Lin Chen, Monroeville, Pa., assignor, by mesne assignments, to the United States of America as represented by the Secretary of the Navy
Filed Nov. 8, 1966, Ser. No. 593,242
3 Claims. (Cl. 73—304)

ABSTRACT OF THE DISCLOSURE

A liquid level indicator in the form of a hollow gauge body connected to a fluid storage container, whereby fluid from the container may enter the body and assume the same level as that in the container. A plurality of vertically spaced apart electrical contacts are affixed to the wall of the gauge body which is composed of a material having a high specific ohmic resistance compared to the resistance of the fluid. A meter is connected to the plurality of contacts to ascertain the resistance which is indicative of the fluid level.

---

This invention relates to a liquid level gauge and more specifically to a device for measuring the level of liquid of a corrosive or otherwise variable material requiring closed containers.

There appears to be no simple and yet reliable device existing for continuously measuring the liquid metal level inside a sealed off metal tube or metal container. The problem becomes quite serious if the liquid metal and/or vapor is very corrosive (such as cesium, for example). The usual method of measuring the level of the liquid electrically involves the use of metal-insulator joints. These may prove to be inadequate in this case, for the corrosive characteristics of the liquid or its vapor may attack the metal-insulator joints and leaks may be developed in time. Should the liquid metal (such as cesium) be combustible in contact with the air or moisture, serious accidents could ensue. Since liquid metals are used more and more in many types of devices (for example, MHD closed loops, liquid cooled nuclear reactors, thermionic energy converters, lamps and high power switches), the handling and determination of the liquid levels is important.

Therefore it is an object of this invention to provide an improved liquid level gauge.

It is yet a further object of this invention to provide a liquid-metal gauge capable of measuring the liquid levels of corrosive and combustible materials which if exposed in a system having joints attackable by the metal could be dangerous.

It is still a further object of this invention to provide an improved level gauge, comprising: a container having the capacity for the storage of a material in fluid form; a hollow gauge body; a hollow member coupling the gauge body to the container; a first electrical means, including a first contact in low ohmic contact with the gauge body; a second electrical means, including a second contact in low ohmic contact with the gauge body and spaced from the first electrical contact; means coupled between the first and second electrical means for measuring the electrical resistance therebetween, the resistance varying from a large value when the gauge body is empty to a small value when the gauge body is full.

Another object of this invention is to provide an improved level gauge, comprising: a container having the capacity for the storage of a material in fluid form; a hollow gauge body disposed about a longitudinal axis having first and second ends; a member coupling the container and the gauge body for allowing stored material in the container and body to flow therebetween and to seek common levels; a first electrical contact in low ohmic contact with one of the ends; a second electrical contact in low ohmic contact with the gauge body and movable between the first and second ends; and means coupled between the first and second electrical contacts to measure the electrical resistance therebetween, the gauge body walls having a high specific ohmic resistance compared to the specific ohmic resistance of a material whose level is to be measured.

Still a further object of this invention for the improved level gauge wherein means are provided for equalizing the gas pressure throughout the system, the means being of high ohmic resistance.

Other objects, advantages and novel features of the invention will become apparent from the following detailed description of the invention when compared in conjunction with the accompanying drawings wherein:

FIGURE 1 is one embodiment of the invention;
FIGURE 2 is a graph showing the resistance measurements of the device of FIGURE 1;
FIGURE 3 is a second embodiment of the invention;
FIGURE 4 is a second graph usable with the embodiment shown in FIGURE 3; and
FIGURE 5 is a liquid metal gauge installed in operation with the tank full of liquid metal.

The principal of operation of the gauge shown here in embodiments 1, 3, and 5 in the figures is based on the distinct difference of the electrical resistance per unit length above and below the level of liquid in a metal tube having thin walls.

As shown in FIGURE 1 there is a thin wall tube 10 having closed upper end 11 and lower end 12 disposed along an axis 10$a$; a port 13 couples the device to a system 14. End 12 has a metallic contact 15 soldered thereto with low resistance solder. A movable contact 16 is shown as an arrow movable along the wall of tube 10 substantially parallel to the axis 10$a$. A liquid metal 17, shown in cross-sectional area, is at a level 18 to be measured. That level $L_0$ is designated as the distance between terminal 15 and level 18. The distance contact 16 is from contact 15 is designated 19 in tube 10, a thin wall tube, in this embodiment has a thickness in the neighborhood of .005 to .010 inch thick compared to a diameter 20, of $\frac{3}{16}$ of an inch. A meter 21 is connected between the terminals 15, 16 to obtain readings of the resistance therebetween.

FIGURE 2 shows the method of calibrating the liquid level. As the contact 16 is moved in the vertical direction which is represented as the horizontal axis designated length, the resistance will go up if the contact 16 is moving towards end 11. Assuming that contact 16 starts at the point next to terminal 15 then the length would be substantially zero and the reading would be basically the reading of the system with zero level indicated. As contact 16 moves in an upward direction where there is a liquid in the tube the resistance measure between points 15 and 16 increases in a straight line relationship, which is shown as line 22 in FIGURE 2. In effect, the resistance is that of the liquid since it has a much greater cross-section than the tube wall. At the point of level 18 there is a noticeable discontinuity in the curve and the resistance measured will follow the line 23 of FIGURE 2. The intersection of these two lines indicates the level of the material.

The embodiment shown in FIGURE 3 takes care of a problem which would be encountered if a sliding contact 16, of FIGURE 1, were used in a atmosphere which might make the tube corroded. The thin walled tube 30, of FIGURE 3, has an upper end 31 and a lower end 32 upon which is fastened a contact 33 having very low resistance. A plurality of contacts are attached to the thin wall member 30 and these are designated as 34, 35, 36, 37, 38, 39, and 40. These have a fixed relationship with respect to each other and are connected to a switch which may selectively contact individual ones of the wires. A meter 41 is connected selectively through switch 42 to read the resistance.

FIGURE 4 shows the technique of measuring the liquid level in the gauge of FIGURE 3 once it has been calibrated. Plotted in FIGURE 4 are two curves, one designated 50 which is the resistance that would be read in the event that the gauge or tube 30 was full, which can be seen from inspection of the FIGURE 3, would mean that the resistance between point 40 and terminal 33, being full of liquid metal, would have a resistance of some known uniform per unit length amount. In operation when the level reaches some unknown amount between the contact of 40 and 33 there will be a reading of resistance along the vertical line labeled $B_n$ in FIGURE 4. A line drawn through that point 51 parallel to the calibration line 52 will give an intersection 53 which determines and reads out the level of liquid.

FIGURE 5 shows a liquid level gauge of FIGURE 3 connected to a tank and measuring a level of liquid therein. In this device a coiled thin walled small tubing 60 is provided connected to the tank to provide an adequate high electrical resistance to the tank so that it will not effect the resistance readings of the gauge yet will provide for a balancing of the gas pressures above the two levels of liquid.

Throughout this application resistance of the thin walled tube has generally been described as high compared to the resistance of the liquid columns. These are relative terms and one skilled in the art practicing this invention would select parameters which would give significant readings in practicing the invention. For example, FIGURE 2 shows the resistance along the vertical axis in hundreths of ohms and the length on the horizontal axis is in centimeters. Thus, curve 23 represents the resistance which would be read in measuring the empty tube resistance. Since, the selected embodiment has very thin walls, although of metal composition, the resistance per centimeter is higher than the resistance per centimeter of liquid having the diameter 20 in the tube. Once the gauge has been built for measuring a selected liquid it may be calibrated for all levels of liquid.

FIGURE 4 has been drawn with a smooth line connecting points but it should be noted that in practice as shown, a series of points would be plotted as the switch is moved from contact to contact.

Obviously many modifications and variations of the present invention are possible in the light of the above teachings. It is therefore to be understood that within the scope of the appended claims the invention may be practiced otherwise than as specifically described.

I claim:
1. An improved level gauge, comprising:
   (a) a container having the capacity for the storage of a material in fluid form;
   (b) a hollow gauge body disposed about a longitudinal axis having first and second ends;
   (c) a member coupling said container and said gauge body for allowing stored material in said container and body to flow therebetween and to seek common levels;
   (d) a first electrical contact in low ohmic contact with one of said ends;
   (e) a second electrical contact in low ohmic contact with said gauge body and movable between said first and second ends; and
   (f) means coupled between said first and second electrical contacts to measure the electrical resistance therebetween, said gauge body walls having a high specific ohmic resistance compared to the specific ohmic resistance of a material whose level is to be measured.

2. An improved level gauge, comprising:
   (a) a container having the capacity for the storage of a material in fluid form;
   (b) a hollow gauge body;
   (c) a hollow member coupling said gauge body to said container;
   (d) a first electrical means, including a first contact in low ohmic contact with said gauge body;
   (e) a second electrical means, including a second contact in low ohmic contact with said gauge body and spaced from said first electrical contact;
   (f) means coupled between said first and second electrical means for measuring the electrical resistance therebetween, said resistance varying from a large value when the gauge body is empty to a small value when the gauge body is full; and
   (g) a second hollow member provided between said container and said body to provide for an equalization of the gas pressure above the levels of the material in the container and the body, said second member having a high specific resistance with respect to that of said body.

3. An improved level gauge, comprising:
   (a) a container having the capacity for the storage of a material in fluid form;
   (b) a hollow gauge body;
   (c) a hollow member coupling said gauge body to said container;
   (d) a first electrical means, including a second contact in low ohmic contact with said gauge body and spaced from said first electrical contact, said second electrical means including a plurality of electrical contacts uniformly spaced along and affixed to said gauge body;
   (f) means coupled between said first and second eletcrical means for measuring the electrical resistance therebetween, said resistance varying from a large value when the gauge body is empty to a small value when the gauge body is full; and
   (g) a switching device coupled to said first and second electrical means for measuring the electrical resistance between said first contact and individual ones of said contacts in said second electrical means.

References Cited
UNITED STATES PATENTS
3,094,106   6/1963   Hyman _____ 73—304 XR S. CLEMENT SWISHER, *Primary Examiner.*

DONALD O. WOODIEL, *Assistant Examiner.*

U.S. Cl. X.R.

73—301